May 4, 1965  T. W. DAYKIN ETAL  3,181,194
WINDSHIELD WASHER WIPER COMBINATION
Filed June 25, 1962  2 Sheets-Sheet 1

THEODORE W. DAYKIN
WILLIAM J. PRUNER
INVENTORS

BY John R. Faulkner
Keith L. Zerschling
ATTORNEYS

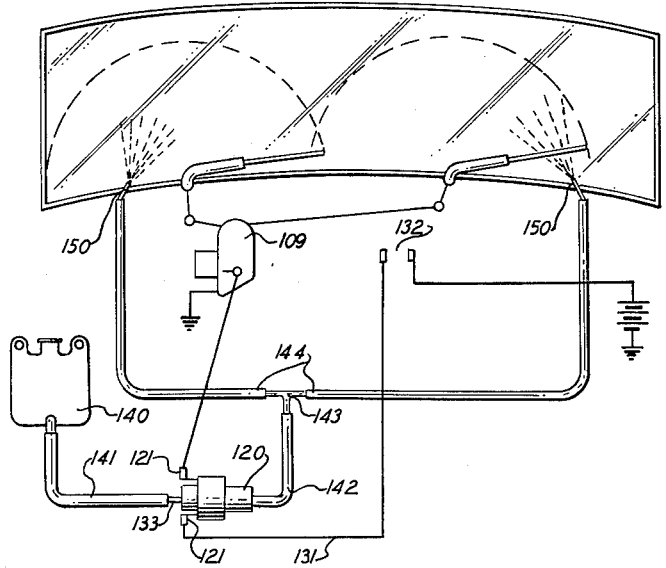
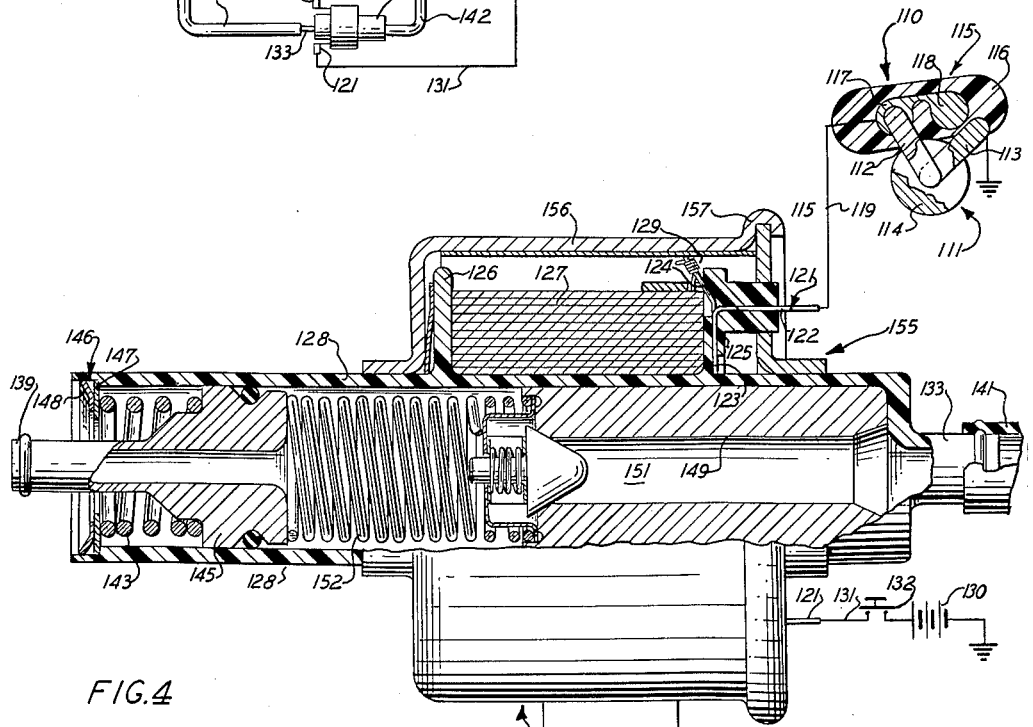

United States Patent Office 3,181,194
Patented May 4, 1965

3,181,194
WINDSHIELD WASHER WIPER COMBINATION
Theodore W. Daykin, Dearborn, and William J. Pruner,
Ann Arbor, Mich., assignors to Ford Motor Company,
Dearborn, Mich., a corporation of Delaware
Filed June 25, 1962, Ser. No. 204,686
7 Claims. (Cl. 15—250.02)

This invention relates to a windshield wiper and washer system. More particularly, the invention relates to a washer that is automatically cycled by the drive mechanism of the windshield wiper.

The invention includes an actuating mechanism which is controlled by the movement of the windshield wiper drive mechanism. The windshield washer drive mechanism periodically operates the actuating mechanism which in turn causes a washer pump to force fluid through a pair of nozzles that spray the washer solution over the surfaces of the windshield.

In the design of an automotive vehicle accessory, it is important that its operation does not unduly burden the driver. The operator of the vehicle should be freed from routine and distracting control tasks so that he may pay strict attention to the guidance of the vehicle and the existing road conditions. The invention provides an inexpensive and relatively simple means for semiautomatically controlling the washing of a windshield which requires little operator attention. Once the washer is actuated by the manipulation of a manual switch control, it will spray a fixed number of squirts per windshield wiper traverse until the operator disengages the washer. Automatic engagement and disengagement of the washer is possible, but not practical as the varying conditions which such a system would be required to respond to and the additional hardware necessary for control under such conditions would make the cost prohibitive. There have been quite a few prior art systems directed to a washer which when engaged sprays a fixed total number of squirts and will then be automatically disengaged. This type of system has the disadvantage that the fixed total number of squirts must be sufficient to clean the windshield under the most adverse conditions or else it would be necessary for the operator to engage the washer a number of times. It is apparent that such a system would waste washer solution if a large total number of squirts were chosen or would involve excessive operator control if too few total squirts were chosen.

The instant invention is a sound compromise which provides minimum operator control, an economic utilization of the washer solution and maximum system simplicity. Other specific structural advantages such as synchronization of windshield blade and washer operation, a minimum number of valves, compactness, a self-priming pump and a design which is protected from damage because of freezing will be completely appreciated when the detailed written description is considered in conjunction with the drawings wherein:

FIGURE 3 is a schematic diagram of an alternate embodiment of the windshield wiper and washer system; and FIGURE 4 is a detailed cross section of the washer pump and associated electrical circuit of the alternate embodiment shown in FIGURE 3.

Figure 1:
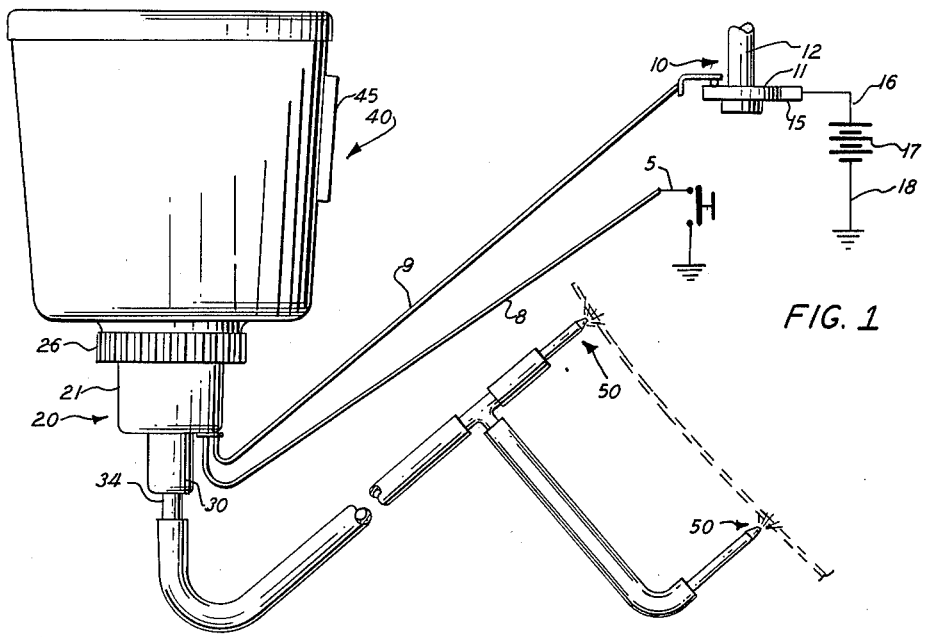
FIGURE 1 is a schematic diagram of the preferred embodiment of the windshield wiper and washer system.
Figure 2:
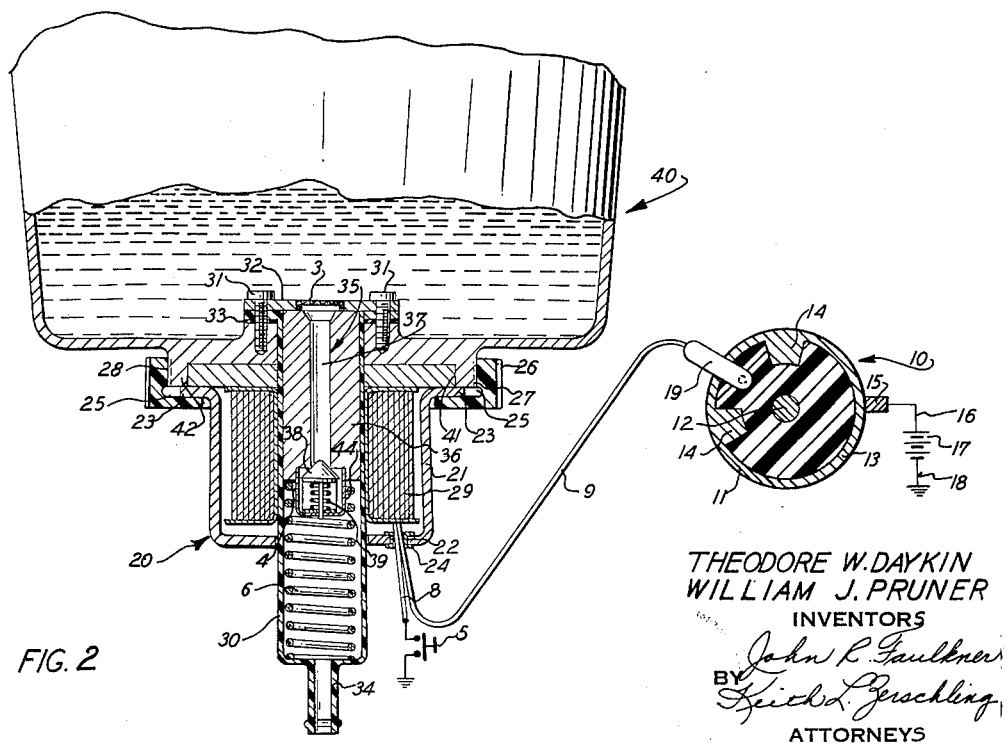
FIGURE 2 is a detailed cross section of the washer pump and the associated electrical circuit.

Referring to FIGURES 1 and 2, the preferred embodiment of the invention comprises a switch 10, a pump 20, reservoir 40, and the windshield nozzles 50. The switch 10 has a rotor 11 attached to a shaft 12 which forms part of the means for coupling the windshield wiper motor (not shown) to the windshield wiper blade (not shown). The rotor 11 includes a conductor ring 13 which is electrically connected to the conductor segments 14 and which is electrically connected to ground via a brush 15, a conductor 16, the battery 17, and the conductor 18. A stator or contact finger 19 made of conductive material is electrically connected to conductor 9 and forms a conductive path to the pump 20 or more particularly to the solenoid coil which forms part of the pump. The stator 19 is located adjacent the rotor 11 and periodically makes electrical contact with the conductive segments 14. The segments 14 contact the stator 19 and complete an electrical circuit from the battery 17 through the conductor 16, the brush 15, the conductor ring 13, one of the segments 14, the stator 19, to the solenoid coil.

The pump 20 may include a housing 21 having an aperture 22 and a flange 23. The aperture 22 contains an insulating washer 24 for receiving the conductors 8 and 9. The flange 23 is fitted into a peripheral groove 25 in a clamp member 26. The clamp member 26 has slots 27 and 28 for receiving the tabs 41 and 42 which are integral with the reservoir 40. The clamp member 26 may take the form of a molded plastic nut while the tab members 27 and 28 may take the form of a threaded peripheral ridge.

The housing 21 surrounds an actuating means or an electrical actuating means 29 which takes the form of a solenoid coil. A fluid chamber 30 is located adjacent to and concentric with the solenoid coil 29 and is rigidly attached to the reservoir 40 by the fastening means 31, the plate 32 and the rubber seal 33. The fluid chamber 30 may take the form of a molded plastic cylinder having an integral outlet 34. The plate 32 may include an integral screened port 3 which communicates with a port or valve means 35 in the piston or armature 36. The valve means 35 comprises a passageway 37 and a check valve 38 which is resiliently urged into a closed position by a spring 39 that is rigidly fixed to the armature or piston 36 by the bracket 44. The piston 36 is adapted to slide in the fluid chamber 30 and is normally biased by a spring 6 to abut the plate 32.

The reservoir 40 may take the form of a molded plastic container having an integral fluid chamber 30. A bracket 45 is rigidly attached to the reservoir 40 and is utilized to attach the entire assembly to the vehicle body.

FIGURE 2 shows the parts in the position they assume when the actuating means or solenoid coil 29 is inoperative or more particularly de-energized. In this condition, the passageway 37 is closed as the check valve 38 is urged by spring 39 to abut the end of the passageway 37. Assuming the contacts 5, that may take the form of a push button switch, have been closed by the operator, then, as the conductive segments 14 contact the stator 19, an electrical circuit is completed from the battery 17 to the solenoid coil 29. The completing of the electrical circuit will energize the solenoid coil 29 and cause the armature 36 to slide downwardly against the force of the spring 6. The movement of the armature 36 in a downward direction will cause the check valve 38 to remain closed which results in the fluid in the fluid chamber 30 being pumped through the outlet 34. The fluid forced through the outlet 34 is transmitted to the nozzles 50 which are positioned adjacent the windshield to cause a cleaning spray to be distributed over the windshield. Subsequently, the continued rotation of the conductive segments 14 by the shaft 12 which is driven by the windshield wiper motor will cause the nonconductive portion of the rotor 11 to contact the stator 19. This will cause the solenoid coil 29 to be-energized or made inoperative which results in the armature 36 being moved in an upward direction by the spring 6. The movement of the armature 36 in an upward direction causes the check valve 38 to be opened by the downward force of the fluid in the reservoir 40, thus permitting the fluid to flow into the fluid chamber 30. When the armature 36 abuts the plate 32, the spring 39 will again cause the check valve 38 to close the passageway 37.

The above cycle will be continued so long as the contacts 5 remain closed. The operator of the vehicle may close or open the contacts 5 at any time. The number of squirts per wiper blade traverse will be dependent upon the number of conductive segments 14 placed on the rotor 11.

It should be noted that the pump relies on a gravity feed and that only one check valve is necessary to control the pumping and priming of the pump. Further, the preferred embodiment provides a windshield wiper washer system that is compact, economical to manufacture, and utilizing a minimum number of parts. The preferred system also has the advantageous feature of intermittently spraying the windshield with a washer solution when operated by the operator of the vehicle. This spraying of the windshield is synchronized with the movement of the wiper blades.

An alternate embodiment of the invention is shown in FIGURES 3 and 4. This embodiment of the invention operates on the same principle as the preferred embodiment shown in FIGURES 1 and 2. There are, however, a few added features and changes in the arrangement of the parts. This embodiment of the invention includes an electric windshield wiper motor and drive mechanism or means 109, a switch 110 supported by the electric windshield wiper motor and drive mechanism or means, a pump 120, spray nozzles 150, and a reservoir 140. The reservoir 140 takes the form of a plastic bag which is physically separated from the pump 120 but is connected thereto by a plastic tube 141. The pump 120 is connected to the windshield nozzles 150 by the plastic tube 142, the T connector 143, and the plastic tubes 144.

The switch 110 includes a rotor 111 which has two electrically conductive contact arms 112 and 113. The arm 112 is rigidly connected to the shaft 114 which forms a part of the windshield wiper blade drive mechanism, while the arm 113 is electrically and rigidly connected to ground and pivotally and electrically connected to the arm 112. The conductive arms 112 and 113 are electrically insulated from the shaft 114. The conductive arm 112 is adapted to slide across the stator 115 which has a body 116 made of insulating material and a pair of conductive segments 117 and 118 which are connected via conductor 119 to the solenoid terminal 121. The solenoid terminal 121 has three legs 122, 123, and 124. The leg 123 is molded into one of a pair of circumferential extensions 125 and 126 which are integral with the fluid chamber 128 and form a channel for holding a solenoid coil 127. The legs 122 and 124 form terminals which are connected to the conductors 119 and 129 respectively. The conductor 129 is in turn electrically connected to the solenoid coil 127. The lower portion of the fluid chamber 128 has a similar terminal arrangement. The lower terminal 121 is, however, connected to the battery 130 via a conductor 131 and normally open contacts 132 which are operated by a manual control placed on the dashboard (not shown). The normally open contacts 132 may take the form of a push button switch.

The fluid chamber 128 has an inlet 133 which is connected to the reservoir 140 by the plastic tube 141. An outlet member 139 is resiliently coupled to the fluid chamber 128 by a spring 143 that is interposed between a shoulder 145 on the outlet member 139 and a fastening means 146. The fastening means 146 comprises a circular plate or washer 147 and a press fit disc 148. The armature 149, the valve means 151, and the spring 152 are identical to the armature 36, the valve means 35, and a spring 6 described in conjunction with the preferred embodiment shown in FIGURES 1 and 2.

The pump 120 has a hub member 155 which is fixed to the fluid chamber 128 and a housing 156 having a shoulder 157 which is spun over the hub member 155 to enclose the solenoid coil 127. The housing 156 has a bracket member 158 which is utilized to attach the pump assembly to the automotive vehicle.

It should be noted that the alternative embodiment shown in FIGURES 3 and 4 has an added feature that will permit the fluid in the fluid chamber 128 to freeze without damaging the pump. Fluid in chamber 128 may freeze and expand, and this will move outlet member 139 to the left, as viewed in FIGURE 4, against the bias of spring 143. This feature prevents the pump 120 from being damaged by freezing temperatures. In its other aspects, the operating principles of the alternative embodiment are identical to the operating principles of the preferred embodiment.

In summary, the operator of the vehicle actuates the control on the dashboard to close the contacts 132 and operate the washer pump 120. The washer pump 120 will thereafter be operated by the drive mechanism which oscillates the windshield wiper blades. The shaft 114 of the drive mechanism causes the arm 112 of the rotor 111 to move across the stator 115 to periodically energize the solenoid coil 127 to cause a spray to be distributed over the windshield by the spray nozzles 150.

It should be apparent that the invention provides inexpensive and relatively simple means for automatically controlling the washing of a windshield. The method of washer operation involves little, if any, wasted washer solution. This economic utilization has the additional advantage that the reservoir need only be filled occasionally, thus partially freeing the automobile owner from a troublesome chore. It should be noted that the squirts from the windshield nozzles are synchronized with the movement of the windshield blades and a squirt can be timed so that it will receive a maximum distribution by the subsequent sweep of the wiper blade. The particular pump utilized in the invention has the advantage of embodying a self-priming gravity feed and requiring only one valve for control purposes. In addition, the structure is safe from any freezing damage and is simple and compact.

It will be understood that the invention is not to be limited to the exact construction shown and described and that various changes and modifications may be made without departing from the spirit and scope of the invention, as defined in the appended claims.

We claim:

1. In a vehicle having a windshield wiper and washer system, the combination comprising: a windshield wiper motor having a driving shaft, an actuating means having an operative and inoperative position, said actuating means adapted to be periodically operated by said driving shaft of said windshield wiper motor, a reservoir, a windshield nozzle, a fluid chamber coupled to said windshield nozzle, a piston coupled to said fluid chamber, said piston adapted to be actuated by said actuating means when said actuating means is operative, a valve located in said piston and having an open position when said actuating means moves to an inoperative position and a closed position when said actuating means is operative, said valve coupled to said reservoir and said fluid chamber to permit fluid to flow from said reservoir into said fluid chamber when said valve is in an open position and said valve preventing fluid from flowing from said reservoir to said fluid chamber when in a closed position, said piston and valve cooperating to force fluid from said fluid chamber through said nozzle when said valve is in a closed position and said piston is actuated.

2. In a vehicle having a windshield wiper and washer system, the combination comprising: a windshield wiper motor having a driving shaft, an actuating means having an operative and inoperatvie position, said actuating means adapted to be periodically operated by said driving shaft of said windshield wiper motor, a reservoir, a windshield nozzle, a fluid chamber coupled to said windshield nozzle, a piston adapted to slide in said fluid chamber in a first and second direction, a valve located in said piston and having an open position when said piston slides in said first direction and a closed position when said piston slides in said second direction, said valve coupled to said reservoir and said fluid chamber to permit fluid to flow from said reservoir into said fluid chamber when said valve is in an open position and said valve preventing fluid from flowing from said reservoir to said fluid chamber when in a closed position, said reservoir located above said piston, said piston adapted to be actuated by said actuating means when said actuating means is operative, said piston coupled to said fluid chamber to force fluid from said fluid chamber through said nozzle when said valve is in a closed position and said piston is actuated.

3. In a vehicle having a windshield wiper and washer system, the combination comprising: a windshield wiper motor having a driving shaft, an actuating means having an operative and inoperative position, said actuating means adapted to be periodically operated by said driving shaft of said windshield wiper motor, a reservoir, a windshield nozzle, a fluid chamber coupled to said windshield nozzle, a piston adapted to move in said fluid chamber, said reservoir located above said piston and integral with said fluid chamber, a valve located in said piston and having an open position and a closed position, said valve coupled to said reservoir and said fluid chamber to permit fluid to flow from said reservoir into said fluid chamber when said valve is in an open position and said valve preventing fluid from flowing from said reservoir to said fluid chamber when in a closed position, said piston adapted to be actuated by said actuating means when said actuating means is operative, said piston coupled to said fluid chamber to force fluid from said fluid chamber through said nozzle when said valve is in a closed position and said piston is actuated.

4. In a vehicle having a windshield wiper and washer system, the combination comprising: a windshield wiper motor having a driving shaft, an actuating means having an operative and inoperative position, said actuating means adapted to be periodically operated by said driving shaft of said windshield wiper motor, a reservoir, a windshield nozzle, a fluid chamber coupled to said windshield nozzle, a valve having an open position and a closed position, said valve coupled to said reservoir and said fluid chamber to permit fluid to flow from said reservoir into said fluid chamber when said valve is in an open position and said valve preventing fluid from flowing from said reservoir to said fluid chamber when in a closed position, a piston adapted to be actuated by said actuating means when said actuating means is operative, said piston coupled to said valve to move said valve to a closed position when said piston is actuated by said actuating means, said piston coupled to said fluid chamber to force fluid from said fluid chamber through said nozzle when said valve is in a closed position and said piston is actuated.

5. In an automotive vehicle having a windshield and a windshield wiper and washer system, the combination comprising: a plurality of windshield wiper blades, a drive means for driving said windshield wiper blades, said drive means including a movable shaft, said drive means connected to said windshield wiper blades, a spray nozzle located adjacent said windshield to distribute a spray of washer solution over said windshield, an electrically operated pump operatively coupled to said spray nozzle, an electrical power source and a switch in circuit with said power source and said electrically operated pump, said switch comprisnig a rotor contact rigidly connected to said movable shaft and electrically connected to ground, a rotor connected to be operated by said movable shaft and having a conductive portion electrically connected to said rotor contact, a stator having a conductive portion electrically connected to said electrically operated pump and a nonconductive portion, said conductive portion of said rotor periodically contacting said conductive and said nonconductive portions of said stator as said movable shaft operates whereby said electrically operated pump is periodically energized and the washer solution is distributed over the windshield in synchronism with the movement of the wiper blades.

6. In an automotive vehicle having a windshield, a windshield wiper, a motor for driving said windshield wiper and a shaft connecting said windshield wiper to said motor, the combination comprising, a windshield nozzle located adjacent the windshield, a switch adapted to be periodically operated by said shaft, a reservoir, a pump comprising a fluid chamber, an outlet operatively coupled to said fluid chamber and said windshield nozzle, a solenoid having a coil and an armature, said coil in circuit with said switch, said switch including a conductive rotor contact rigidly connected to said shaft and electrically connected to ground and a stator having a conductive path connected to said solenoid and located adjacent said rotor contact, said armature forming a piston having a valve means therein which is operatively coupled to said reservoir and said fluid chamber, said piston adapted to be actuated when the coil is energized, said valve means for forcing fluid from said fluid chamber, and through said outlet to said windshield nozzle when said piston is actuated by the energization of said coil and for permitting flow from said reservoir through said valve means and into said fluid chamber when said coil is de-energized.

7. In an automotive vehicle having a windshield, a windshield wiper, a motor for driving said windshield wiper and a coupling means for operatively connecting said windshield wiper to said motor, the combination comprising, a windshield nozzle located adjacent the windshield, a switch adapted to be periodically operated by the coupling means, a reservoir, a pump comprising a fluid chamber, an outlet operatvely coupled to said fluid chamber and said windshield nozzle, a solenoid having a coil and an armature, said coil in circuit with said switch, said armature forming a piston having a valve means therein which is operatively coupled to said reservoir and said fluid chamber, said piston adapted to be actuated when the coil is energized, said valve means for forcing fluid from said fluid chamber, and through said outlet to said windshield nozzle when said piston is actuated by the energization of said coil and for permitting flow from said reservoir through said valve means and into said fluid chamber when said coil is deenergized, said outlet including an outlet member having a passageway connected to said fluid chamber and said nozzle and a resilient means for permitting said outlet member to move whereby the freezing of any fluid in the fluid chamber will not damage the pump.

References Cited by the Examiner

UNITED STATES PATENTS 2,193,141    3/40    Price _____ 103—53
2,757,615    8/56    Bolles et al. _____ 15—250.02

FOREIGN PATENTS 997,554    9/51    France.
915,421    7/54    Germany

CHARLES A. WILLMUTH, *Primary Examiner.*